United States Patent
Hirokane

(10) Patent No.: US 9,288,859 B2
(45) Date of Patent: Mar. 15, 2016

(54) LIGHT EMITTING DIODE DRIVING CIRCUIT, DISPLAY DEVICE, LIGHTING DEVICE, AND LIQUID CRYSTAL DISPLAY DEVICE

(71) Applicant: Sharp Kabushiki Kaisha, Osake (JP)

(72) Inventor: Masahiro Hirokane, Osaka (JP)

(73) Assignee: SHAPR KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/438,726

(22) PCT Filed: Oct. 25, 2013

(86) PCT No.: PCT/JP2013/078981
§ 371 (c)(1),
(2) Date: Apr. 27, 2015

(87) PCT Pub. No.: WO2014/069366
PCT Pub. Date: May 8, 2014

(65) Prior Publication Data
US 2015/0296579 A1 Oct. 15, 2015

(30) Foreign Application Priority Data
Nov. 1, 2012 (JP) .................................. 2012-242116

(51) Int. Cl.
*H05B 37/02* (2006.01)
*H05B 33/08* (2006.01)
*G02F 1/1335* (2006.01)

(52) U.S. Cl.
CPC ...... *H05B 33/0818* (2013.01); *G02F 1/133603* (2013.01); *H05B 37/02* (2013.01); *G02F 2001/133612* (2013.01)

(58) Field of Classification Search
CPC . H05B 33/0815; H05B 33/0827; H05B 37/02
USPC .................. 315/291, 294, 297, 307, 308, 360
See application file for complete search history.

(56) References Cited

U.S. PATENT DOCUMENTS

| 7,145,295 | B1 * | 12/2006 | Lee et al. ...................... 315/291 |
| 2008/0252236 | A1 * | 10/2008 | Lee et al. ...................... 315/308 |
| 2009/0284171 | A1 * | 11/2009 | Bayadroun .................. 315/294 |
| 2010/0156315 | A1 * | 6/2010 | Zhao .................. H05B 33/0818 315/294 |
| 2011/0298834 | A1 * | 12/2011 | Shin .............................. 345/690 |
| 2014/0001978 | A1 * | 1/2014 | Lee .................... H05B 33/0815 315/297 |

FOREIGN PATENT DOCUMENTS

JP 2009-33090 A 2/2009

* cited by examiner

*Primary Examiner* — Tung X Le
(74) *Attorney, Agent, or Firm* — Chen Yoshimura LLP

(57) ABSTRACT

As a result of being provided with an enable signal generating unit that supplies, to an LED driver, an enable signal that is dependent on a low state period of a PWM signal, it is possible to realize a light emitting diode driver circuit that can suppress a booster circuit starting up suddenly and an excess current flowing in a power source in the case where the PWM signal enters a high state (on state) after having been held in a low state (off state) for a prescribed period or longer.

9 Claims, 8 Drawing Sheets

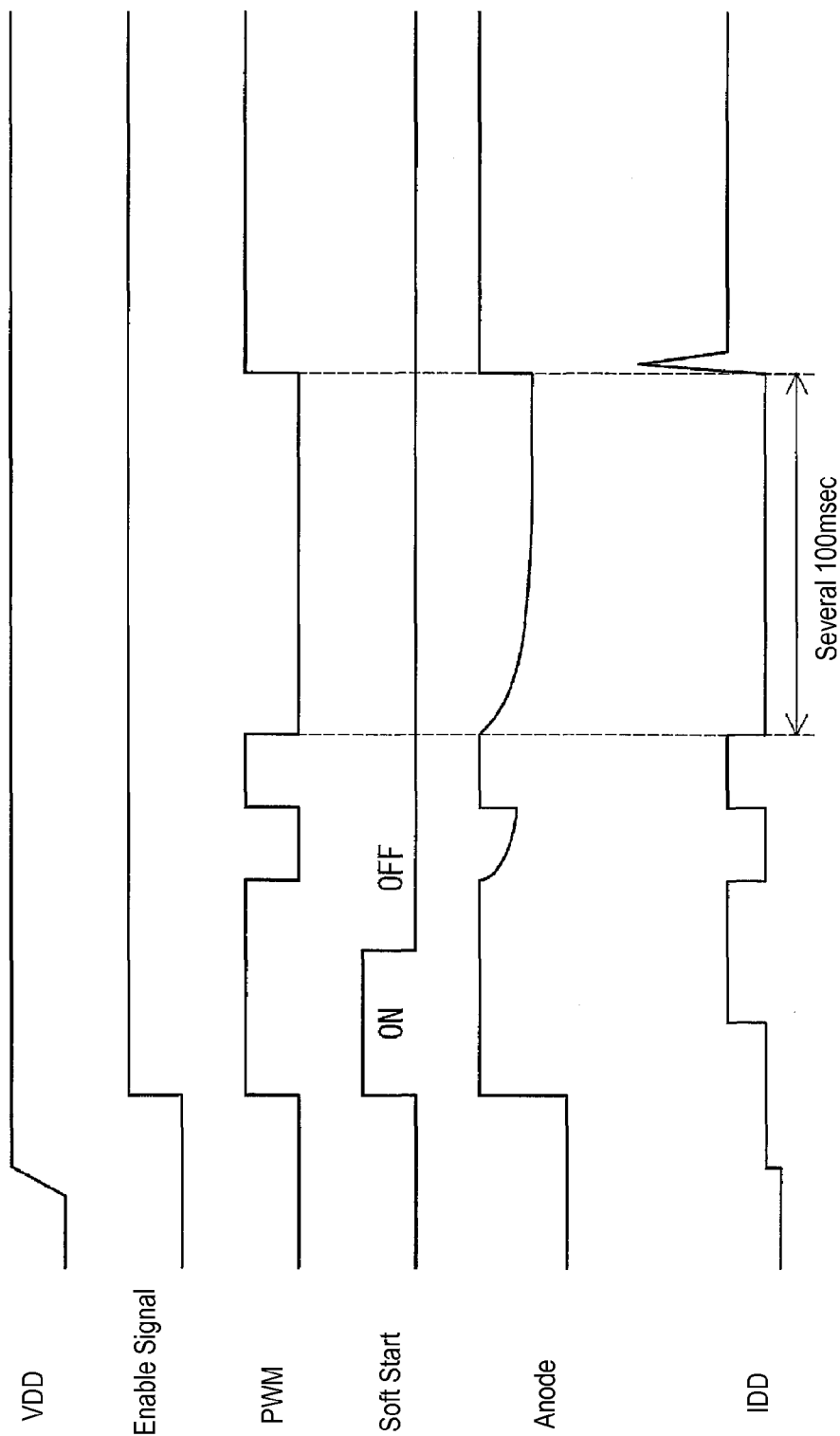

LIGHT EMITTING DIODE DRIVING CIRCUIT, DISPLAY DEVICE, LIGHTING DEVICE, AND LIQUID CRYSTAL DISPLAY DEVICE

TECHNICAL FIELD

The present invention relates to a light emitting diode driver circuit (hereinafter, referred to as an LED driver circuit), and to a display device, an illumination device, and a liquid crystal display device provided with the LED driver circuit.

BACKGROUND ART

LEDs have the features of low power consumption and extremely high luminous efficiency, and in recent years have come to be used in various fields such as display devices, illumination devices, and advertisement devices.

The luminance of such LEDs is generally controlled using a pulse width modulation scheme.

When the luminance of LEDs is controlled with a pulse width modulation scheme (PWM scheme) in this manner, a PWM signal is supplied to an LED driver and the LED driver adjusts the luminance of the LEDs on the basis of this PWM signal.

The LEDs turn off when the PWM signal is low and the LEDs turn on when the PWM signal is high, and the luminance of the LEDs is adjusted according to a low/high period ratio in the PWM signal (on/off duty of the PWM signal).

However, when the LED driver is activated and the PWM signal enters a high state from a low state, an excess current flows in a power source and a defect such as the melting of a fuse mounted in a module is known to occur.

Therefore, Patent Document 1 discloses a configuration provided with a soft start function (function that prevents an excess current from flowing in an LED) that is driven when a PWM signal enters a high state from a low state when an LED driver is activated (after an enable signal has entered a high state from a low state).

FIG. 7 is a drawing showing the start timing and cancellation timing of the soft start function in an LED driving device provided with the soft start function disclosed in the aforementioned Patent Document 1.

FIG. 7(a) shows the case where a high state period of a PWM signal is set to be longer than a low state period, and where the soft start function turns on at the same time that the PWM signal enters a high state from a low state when the LED driver is activated. The soft start function then turns off and is completely canceled when a period that is approximately half of the high state period of the PWM signal has elapsed.

FIG. 7(b) shows the case where the high state period of a PWM signal is set to be shorter than the low state period, and where the soft start function turns on at the same time that the PWM signal enters a high state from a low state when the LED driver is activated, but it is difficult to turn the soft start function off during the high state period of the PWM signal as in FIG. 7(a) because the high state period of the PWM signal is short.

FIG. 7(c) shows the case where, in a situation such as that of FIG. 7(b), the number of times that a PWM signal rises is counted and, at the third signal, the soft start function is turned off and the soft start function is completely canceled.

As described above, the aforementioned Patent Document 1 discloses a configuration in which the elapsed time from a PWM signal entering a high state when an LED driver is activated is counted, and when that count value has reached a prescribed value, the soft start function thereafter is disabled. The aforementioned Patent Document 1 also describes that it becomes possible to greatly reduce the on duty of the PWM signal by using such a configuration, and as a result it is possible to realize an LED driver circuit that can control a load such as an LED to a low driving range with high precision.

RELATED ART DOCUMENT

Patent Document

Patent Document 1: Japanese Patent Application Laid-Open Publication, "Japanese Patent Application Laid-Open Publication No. 2009-33090 (Published on Feb. 12, 2009)"

SUMMARY OF THE INVENTION

Problems to be Solved by the Invention

However, in the LED driver circuit disclosed in the aforementioned Patent Document 1, because the soft start function enters an on state only when the LED driver is activated, the soft start function is ordinarily in an off state at times other than when the LED driver is activated, or in other words, during the normal driving performed by the LED driver, and thus a problem such as the following occurs.

FIG. 8 is a timing chart for explaining a problem of an LED driving device provided with the conventional soft start function described in the aforementioned Patent Document 1.

As depicted in the drawing, first, a power source voltage (VDD) is supplied to the LED driver circuit, and then an enable signal, which controls the on/off of an LED driver that controls a booster circuit provided in the LED driver circuit, and a PWM signal are supplied to the LED driver.

The soft start function then turns on in accordance with the rising of the enable signal, and the soft start function automatically turns off after a prescribed time.

According to this kind of configuration, the soft start function operates and voltage boosting is started when the LED driver is activated, or in other words, in accordance with the rising of the enable signal, and as a result an excess current does not flow in a power source (see IDD) when the LED driver is activated, and a defect such as a fuse melting is rectified.

There are cases where the PWM signal is held in a low state (off state) for several 100 msec or longer due to an erroneous operation of a PWM signal generating device or the like and depending on the type of PWM signal. In such cases, an anode voltage (anode) drops.

However, in the configuration disclosed in the aforementioned Patent Document 1, because the soft start function automatically turns off and is completely canceled after a prescribed time, in the case where the PWM signal has once again entered a high state from a low state, the soft start function does not operate and the booster circuit starts up suddenly, and as a result an excess current flows in the power source (see IDD). A problem therefore arises in that the fuse melts.

The present disclosure takes the aforementioned problem into consideration and an objective thereof is to provide a light emitting diode driver circuit that can suppress a booster circuit starting up suddenly and an excess current flowing in a power source in the case where a PWM signal enters a high state (on state) after having been held in a low state (off state) for a prescribed period or longer.

Means for Solving the Problems

In order to solve the aforementioned problem, a light emitting diode driver circuit according to one aspect of the present invention is a light emitting diode driver circuit including a control unit receiving a pulse width modulation signal and controlling a booster circuit for adjusting a luminance of a light emitting diode in accordance with the pulse width modulation signal; and an enable signal generating unit that generates an enable signal for turning the control unit ON/OFF and supplies the enable signal to the control unit, the enable signal generating unit generating a signal that turns the control unit OFF as the enable signal when the pulse width modulation signal is LOW for a prescribed period or longer, wherein the control unit includes a soft start unit that, when a signal that turns the control unit from OFF to ON is received as the enable signal, causes the control unit to control the booster circuit such that the booster circuit is driven with a soft start.

Effects of the Invention

According to a light emitting diode driver circuit according to one aspect of the present invention, it is possible to realize a light emitting diode driver circuit that can suppress a booster circuit starting up suddenly and an excess current flowing in a power source in the case where a PWM signal enters a high state (on state) after having been held in a low state (off state) for a prescribed period or longer.

BRIEF DESCRIPTION OF THE DRAWINGS

FIG. 8 is a timing chart for explaining a problem of an LED driving device provided with the conventional soft start function described in Patent Document 1.

DETAILED DESCRIPTION OF EMBODIMENTS

Hereinafter, embodiments of the present invention are described in detail on the basis of the drawings. However, the dimensions, materials, shapes, and relative arrangement of the constituent components described in these embodiments merely constitute individual embodiments, and the scope of this invention should not be interpreted in a limited manner on the basis of these.

Embodiment 1

A light emitting diode driver circuit 1 according to a first embodiment of the present invention is as follows when described based on FIG. 1 and FIG. 2.

Figure 1:
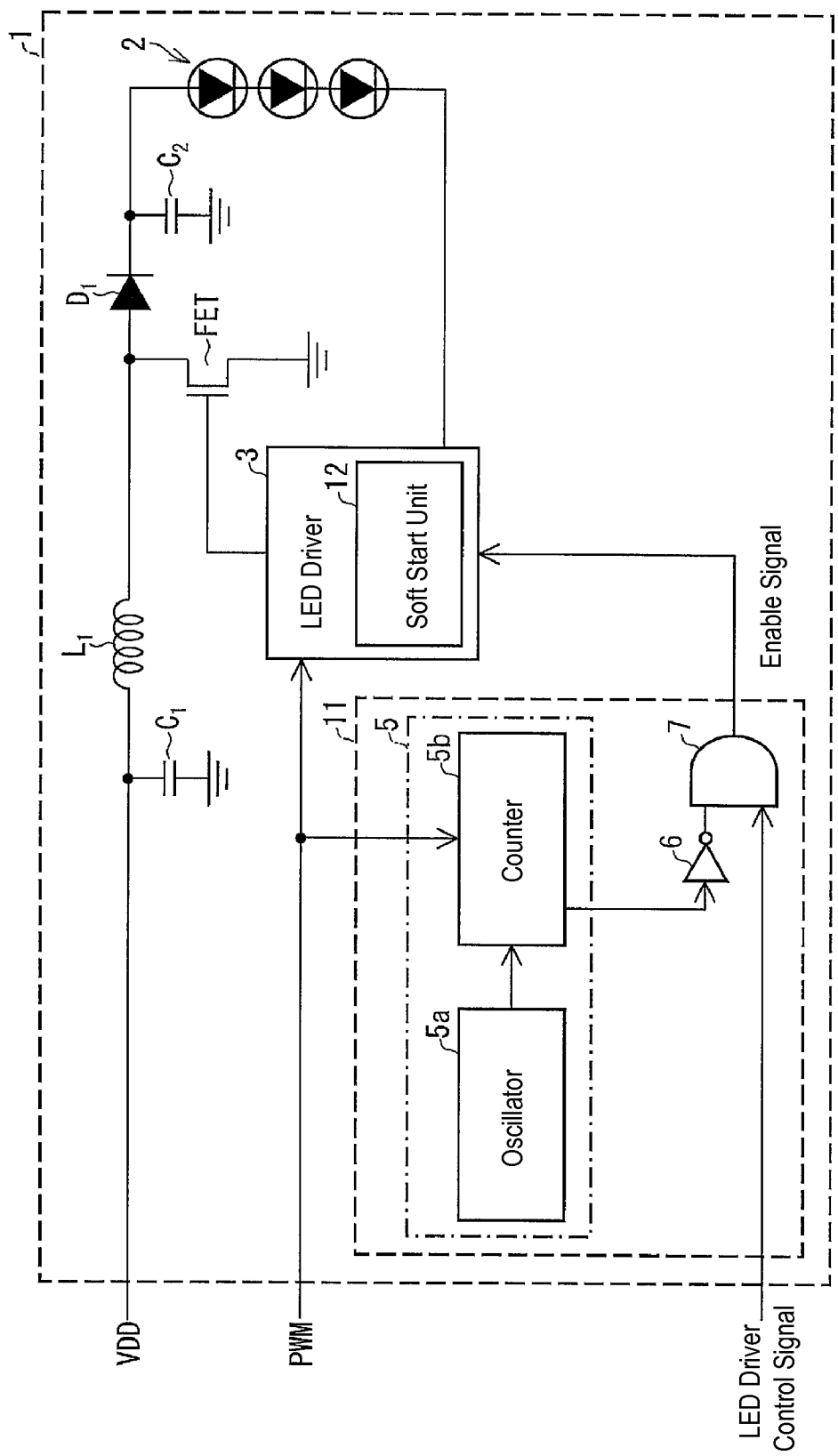
FIG. 1 is a block diagram showing a schematic configuration of a light emitting diode driver circuit of a first embodiment of the present invention provided with light emitting diodes.

FIG. 1 is a block diagram showing a schematic configuration of the light emitting diode driver circuit 1, which is provided with light emitting diodes 2.

As depicted in the drawing, the light emitting diode driver circuit 1 is provided with: a booster circuit provided with capacitors $C_1$ and $C_2$, a coil $L_1$, a diode $D_1$, and a field effect transistor FET; light emitting diodes 2; an LED driver 3 (control unit); and an enable signal generating unit 11.

A power source voltage VDD is supplied from outside to the booster circuit, and a PWM signal for controlling the luminance of the light emitting diodes 2 is supplied to the LED driver 3 and the enable signal generating unit 11.

Then, an LED driver control signal, which is a signal for controlling the on/off of the LED driver 3 and has conventionally been supplied directly to the LED driver 3, is supplied to the enable signal generating unit 11.

The LED driver 3 is an IC that, by way of the field effect transistor FET, controls the booster circuit, supplies a constant current to the light emitting diodes 2 and adjusts the luminance of the LEDs, and is a general-purpose article.

Specifically, on the basis of the PWM signal, the LED driver 3 controls the on/off of the field effect transistor FET, supplies a boosted voltage to the light emitting diodes 2, and supplies a prescribed constant current to the light emitting diodes 2.

A soft start unit 12 is provided in the LED driver 3, and the soft start unit 12 is driven in accordance with an enable signal, which is a signal that is supplied to the LED driver 3 and controls the on/off of the LED driver 3.

The LED driver 3 enters an on state when the enable signal is high, and the LED driver 3 enters an off state when the enable signal is low. When the enable signal changes from low to high, the soft start unit 12 starts being driven and the soft start function turns on, and, after a prescribed period of driving, the soft start function turns off and the soft start function is canceled.

In other words, the soft start unit 12 generates an internal enable signal that becomes high when the enable signal changes from low to high and becomes low after a prescribed period of driving, with which control is performed such that the booster circuit is driven with a soft start.

The PWM signal supplied to the LED driver 3 is a signal for luminance adjustment, with which a current is supplied to the light emitting diodes 2 during a high state and the current that flows to the light emitting diodes 2 is 0 mA during a low state.

A PWM signal such as this has a frequency of several hundred Hz to several kHz, and by changing the duty thereof (the proportion occupied by a high period in a prescribed period), it appears to the human eye as if the luminance is changing.

Then, because the PWM signal has a high frequency as described above and operates at a high speed, it is difficult for the soft start unit 12 to be driven in accordance with the timing at which the PWM signal changes from low to high.

It should be noted that the soft start unit 12 is a component that operates in order to prevent an excess current flowing in the power source (VDD) when the enable signal changes from low to high.

In the present embodiment, general-purpose articles are used without any modification for the booster circuit, the light emitting diodes 2, and the LED driver 3 provided with the soft start function, which are provided in the light emitting diode driver circuit 1.

Conventionally, an LED driver control signal (conventional enable signal) that is not dependent on the PWM signal has been supplied directly to the LED driver 3; however, in the light emitting diode driver circuit 1 there is a difference with the conventional configuration in that an LED driver control signal (conventional enable signal) that is not dependent on the PWM signal is converted by the enable signal generating unit 11 into an enable signal that is dependent on the low state period of the PWM signal and then supplied to the LED driver 3.

Hereinafter, the configuration of the enable signal generating unit 11, which generates an enable signal that is dependent on the low state period of the PWM signal, will be described.

As depicted in the drawing, the enable signal generating unit 11 is provided with a counter circuit 5, an inverter 6, and an AND circuit 7.

The counter circuit 5 is provided with an oscillator 5a and a counter 5b.

A several hundred Hz to several kHz clock created by the oscillator 5a is supplied together with a PWM signal to the counter 5b.

Then, when a period in which the PWM signal is in a low state is counted in the counter 5b on the basis of the clock and this period is equal to or longer than a prescribed period, a counter signal (counter output) is output from the counter 5b.

The counter signal output from the counter 5b becomes an inverted signal by way of the inverter 6 and is input to one terminal of the AND circuit 7, and an LED driver control signal (conventional enable signal) that is not dependent on the PWM signal is input to the other terminal of the AND circuit 7.

The signal that is output from the AND circuit 7 and supplied to the LED driver 3 is an enable signal that is dependent upon the low state period of the PWM signal.

Figure 2:
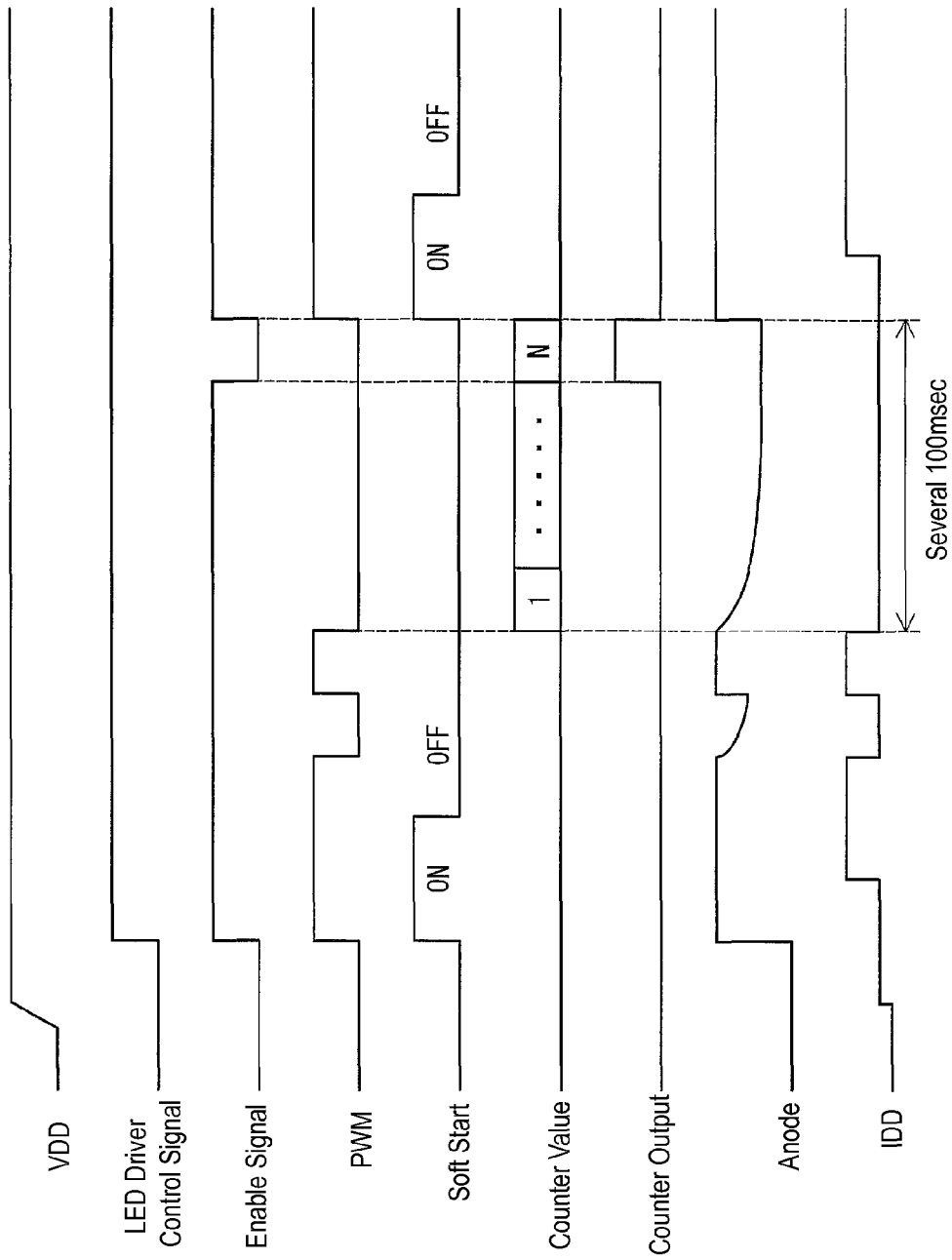
FIG. 2 is a drawing showing an example of the driving timing of the light emitting diode driver circuit depicted in FIG. 1.

FIG. 2 is a drawing showing an example of the driving timing of the light emitting diode driver circuit 1.

As depicted in the drawing, a power source voltage (VDD) is input first, the soft start function turns on when the LED driver control signal (conventional enable signal) that is not dependent on the PWM signal has become high and turns off after a prescribed period of driving, and an excess current therefore does not flow in the power source (VDD) (see IDD).

Then, when the PWM signal enters a low state, an anode voltage (anode) gradually drops according to the length of the period in which the PWM signal is in a low state.

Consequently, the anode voltage (anode) does not drop considerably when the low state period of the PWM signal is equal to or shorter than several milliseconds, and an excess current does not flow in the power source (VDD) even if the soft start function is not used when the PWM signal once again enters a high state (see IDD).

On the other hand, the anode voltage (anode) drops considerably when the low state period of the PWM signal is equal to or longer than several 100 msec, and an excess current flows in the power source (VDD) if the soft start function is not used when the PWM signal once again enters a high state.

The light emitting diode driver circuit 1 of the present embodiment has a configuration that is provided with the enable signal generating unit 11, which generates an enable signal that is dependent upon the low state period of the PWM signal and supplies the enable signal to the LED driver 3, such that the soft start function can be employed when the PWM signal has once again entered a high state after the low state period of the PWM signal has continued for several 100 msec or longer, with the LED driver 3, which is a general-purpose article, being used without any modification.

The following control is carried out in the enable signal generating unit 11 in order to suppress an excess current flowing in the power source (VDD).

As depicted in the drawing, a period in which the PWM signal is in a low state is counted by the counter 5b, and high is output as a counter output from the counter 5b.

The counter output (high) that is output from the counter 5b is input as low by way of the inverter 6 to one terminal of the AND circuit 7. In other words, an inverted signal of the counter output is input to one terminal of the AND circuit 7.

An LED driver control signal (conventional enable signal) that is not dependent on the PWM signal is then input to the other terminal of the AND circuit 7.

Consequently, an enable signal that is output from the AND circuit 7 is a signal that is based on the LED driver control signal (conventional enable signal) and the inverted signal of the counter output, and when the low state period of the PWM signal is equal to or longer than a prescribed period, the enable signal enters a low state and the LED driver 3 enters an off state.

Then, when the PWM signal becomes high once again, the counter 5b is reset and the counter output becomes low. Because the enable signal that is output from the AND circuit 7 then becomes high, the LED driver 3, which has been in an off state, enters an on state, and at such time, the soft start function turns on and an excess current therefore does not flow in the power source (VDD) (see IDD).

As described above, in the light emitting diode driver circuit 1 of the present embodiment, it is possible to suppress the booster circuit starting up suddenly and an excess current flowing in the power source in the case where the PWM signal enters a high state (on state) after having been held in a low state (off state) for a prescribed period or longer.

The light emitting diode driver circuit 1 of the present embodiment may be used to drive light emitting diodes provided in a display unit of a display device, may be used to drive light emitting diodes provided in an illumination device and an advertisement device, and may be used to drive light emitting diodes provided in a backlight that irradiates a liquid crystal display panel with light.

Embodiment 2

Next, a second embodiment of the present invention will be described based on FIG. 3 and FIG. 4. In the present embodiment, the configuration of an enable signal generating unit 13 is different from the aforementioned enable signal generating unit 11 in Embodiment 1, and the configuration besides that is as described in Embodiment 1. For convenience of description, members having the same function as the aforementioned members depicted in the drawings for Embodiment 1 are denoted by the same reference characters and a description thereof is omitted.

Figure 3:
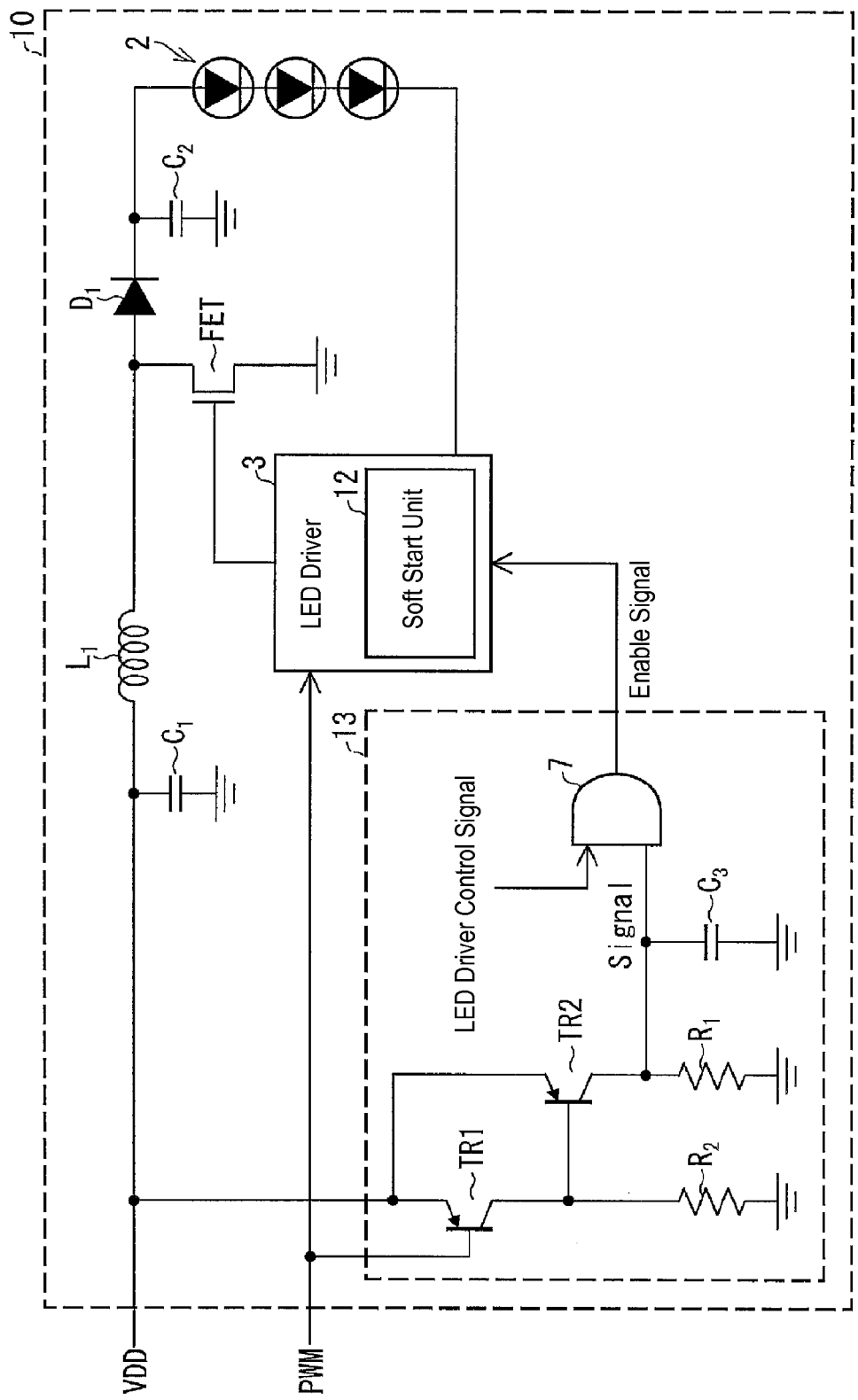
FIG. 3 is a block diagram showing a schematic configuration of a light emitting diode driver circuit of a second embodiment of the present invention provided with light emitting diodes.

FIG. 3 is a block diagram showing a schematic configuration of a light emitting diode driver circuit 10 provided with light emitting diodes 2.

As depicted in the drawing, the enable signal generating unit 13 is provided with: a transistor TR1 for controlling a transistor TR2 on the basis of a PWM signal; the transistor TR2, which controls the charging and discharging of a capacitor $C_3$; and an AND circuit 7.

A PWM signal is supplied to the gate electrode of the transistor TR1, a power source voltage (VDD) is supplied to the gate electrode of the transistor TR2 when the PWM signal is high, and the power source voltage (VDD) is output from the drain electrode of the transistor TR2.

The drain electrode of the transistor TR2 and one terminal of the AND circuit 7 are connected by wiring, and a resistance $R_1$ and the capacitor $C_3$ are provided in the wiring.

The resistance $R_1$ and the capacitor $C_3$ are a resistance and a capacitor that adjust the time in which an enable signal that is output from the AND circuit 7 is brought to a low state (off state), and that time (time constant) τ is determined by τ=$R_1$× $C_3$ (Expression 1).

An LED driver control signal (conventional enable signal) that is not dependent on the PWM signal is input to the other terminal of the AND circuit 7.

The signal that is output from the AND circuit 7 and supplied to the LED driver 3 is an enable signal that is dependent upon the low state period of the PWM signal.

It should be noted that a resistance $R_2$ is provided for the drain electrode of the transistor TR1.

Figure 4:
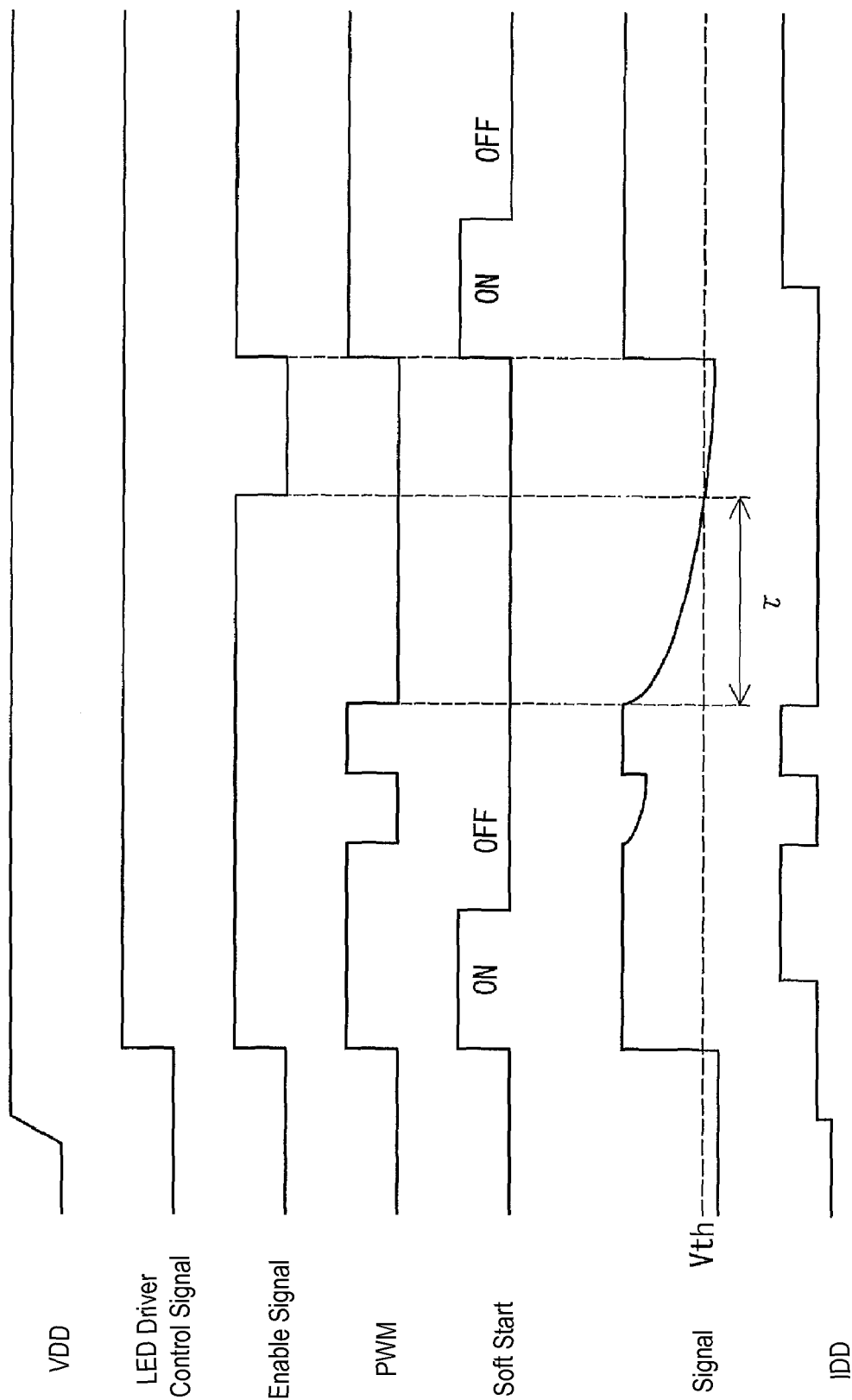
FIG. 4 is a drawing showing an example of the driving timing of the light emitting diode driver circuit depicted in FIG. 3.

FIG. 4 is a drawing showing an example of the driving timing of the light emitting diode driver circuit 10.

As depicted in the drawing, when the PWM signal is high, the voltage (signal) of the wiring that connects the drain electrode of the transistor TR2 and the one terminal of the AND circuit 7 becomes the power source voltage (VDD), and a high voltage is input to the one terminal of the AND circuit 7.

At such time, the LED driver control signal (conventional enable signal) that is not dependent on the PWM signal and is input to the other terminal of the AND circuit 7 is high, and therefore the enable signal that is output from the AND circuit 7 also becomes high and the LED driver 3 enters an on state.

On the other hand, when the PWM signal is low, the transistor TR2 turns off, and as a result the voltage (signal) of the wiring that connects the drain electrode of the transistor TR2 and the one terminal of the AND circuit 7 drops to a threshold voltage Vth or lower of the AND circuit 7 after the time constant (time) determined by τ=$R_1$×$C_3$.

Then, if the voltage (signal) of the wiring that connects the drain electrode of the transistor TR2 and the one terminal of the AND circuit 7 becomes a voltage that is lower than the threshold voltage Vth of the AND circuit 7, the enable signal that is output from the AND circuit 7 becomes low and the LED driver 3 enters an off state.

Thereafter, if the PWM signal becomes high once again, the LED driver 3 activates in a state in which the soft start function has turned on, and an excess current therefore does not flow (see IDD).

As described above, in the light emitting diode driver circuit 10 of the present embodiment, it is possible to suppress a booster circuit starting up suddenly and an excess current flowing in a power source in the case where a PWM signal enters a high state (on state) after having been held in a low state (off state) for a prescribed period or longer.

Embodiment 3

Next, a third embodiment of the present invention will be described based on FIG. 5 and FIG. 6. In the present embodiment, the configuration of an enable signal generating unit 14 is different from the aforementioned enable signal generating unit 11 in Embodiment 1 and the aforementioned enable signal generating unit 13 in Embodiment 2, and the configuration besides that is as described in Embodiments 1 and 2. For convenience of description, members having the same function as the aforementioned members depicted in the drawings for Embodiments 1 and 2 are denoted by the same reference characters and a description thereof is omitted.

Figure 5:
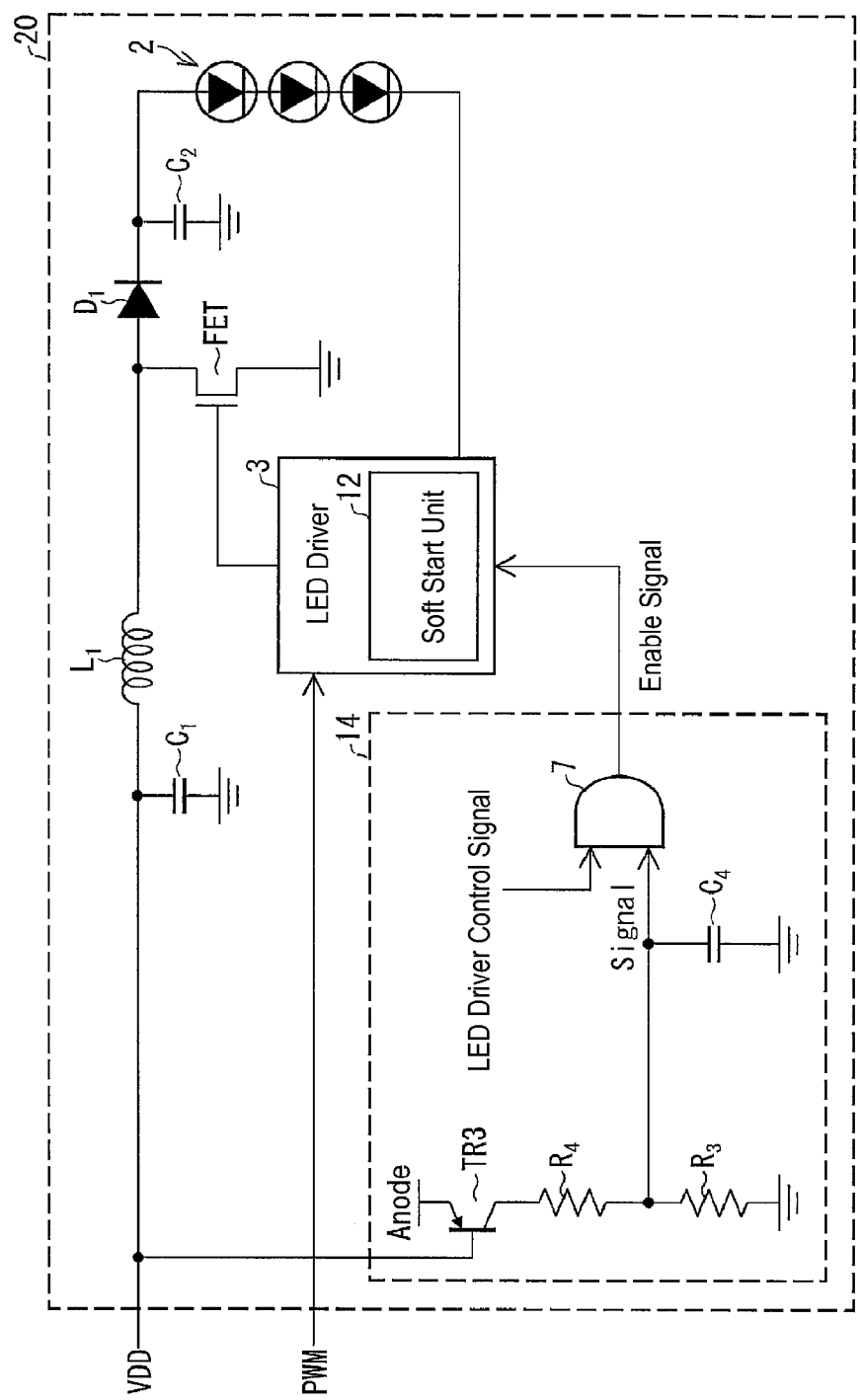
FIG. 5 is a block diagram showing a schematic configuration of a light emitting diode driver circuit of a third embodiment of the present invention provided with light emitting diodes.

FIG. 5 is a block diagram showing a schematic configuration of a light emitting diode driver circuit 20 provided with light emitting diodes 2.

As depicted in the drawing, a transistor TR3 and an AND circuit 7 are provided in the enable signal generating unit 14.

A power source voltage (VDD) that is ordinarily high is supplied to the gate electrode of the transistor TR3 after the light emitting diode driver circuit 20 has been activated.

An anode voltage (anode), which is to be supplied to the light emitting diodes 2, is then supplied to the source electrode of the transistor TR3 by way of a booster circuit provided with capacitors $C_1$ and $C_2$, a coil $L_1$, a diode $D_1$, and a field effect transistor FET.

Figure 6:
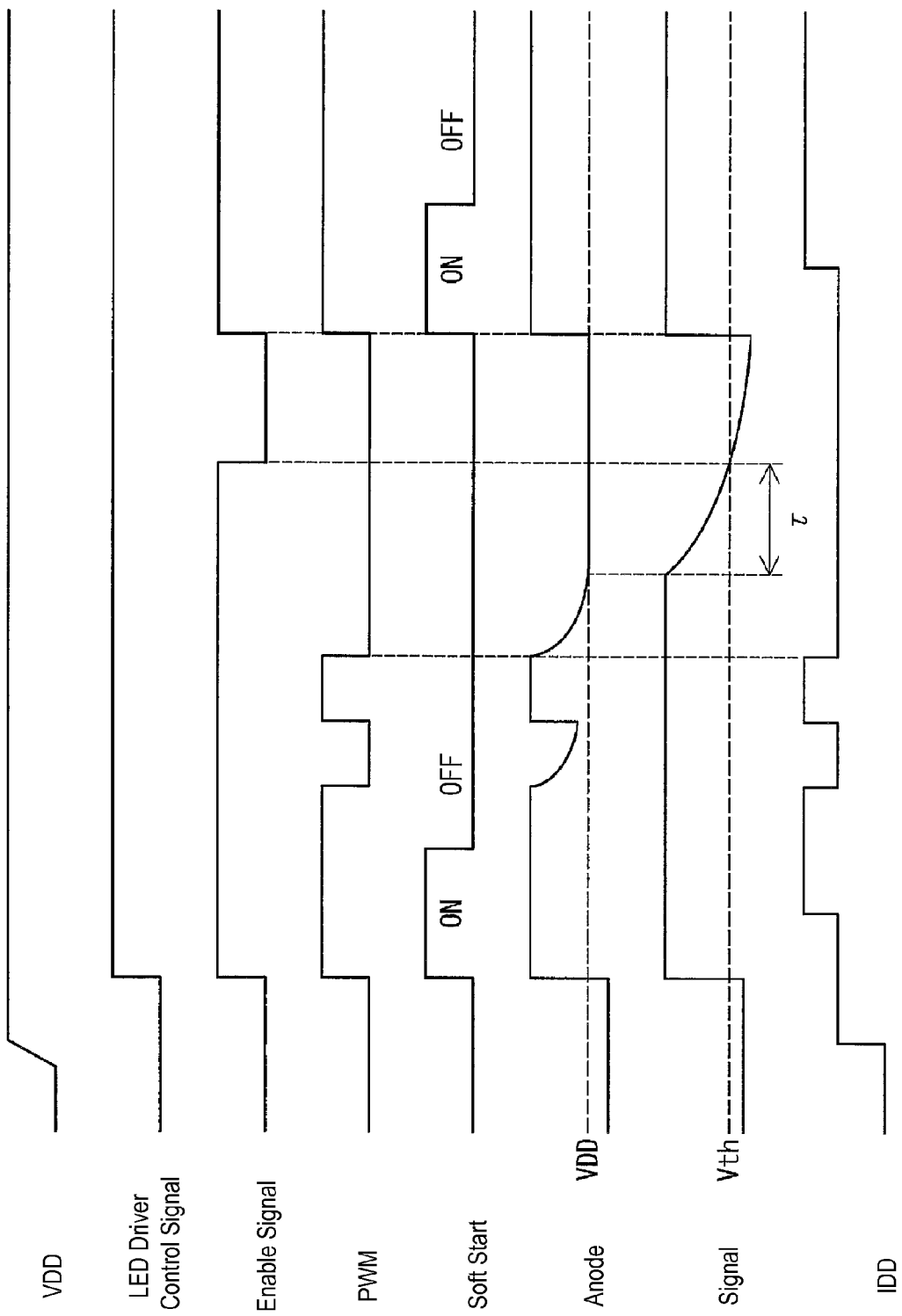
FIG. 6 is a drawing showing an example of the driving timing of the light emitting diode driver circuit depicted in FIG. 5.
Figure 7:
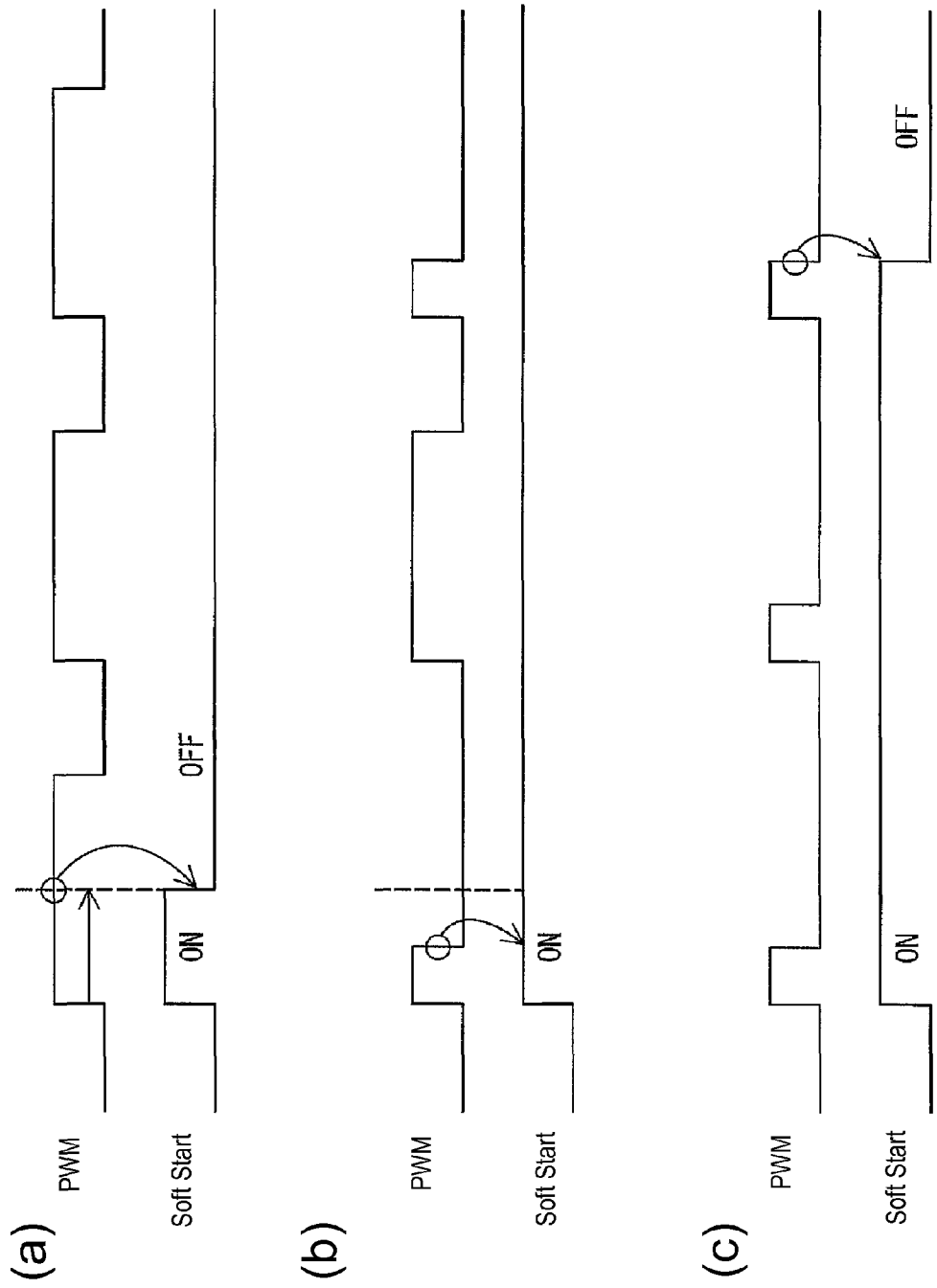
FIG. 7 is a drawing showing the start timing and cancellation timing of a soft start function in an LED driving device provided with the soft start function disclosed in Patent Document 1.

FIG. 6 is a drawing showing an example of the driving timing of the light emitting diode driver circuit 20, which is provided with the light emitting diodes 2.

As already described with regard to the anode voltage (anode) in Embodiment 1, when the PWM signal enters a low state, the anode voltage (anode) gradually drops according to the length of the period in which the PWM signal is in a low state.

Consequently, the anode voltage (anode) does not drop considerably when the low state period of the PWM signal is equal to or shorter than several milliseconds, but the anode voltage (anode) does drop considerably when the low state period of the PWM signal is equal to or longer than several 100 msec.

The transistor TR3 is a transistor that controls the charging and discharging of a capacitor $C_4$.

As depicted in the drawing, a resistance $R_4$ is connected to the drain electrode of the transistor TR3, and wiring provided with the resistance $R_4$ interposed is connected to one terminal of the AND circuit 7. A resistance $R_3$ and the capacitor $C_4$ are provided in the wiring.

Meanwhile, an LED driver control signal (conventional enable signal) that is not dependent on the PWM signal is input to the other terminal of the AND circuit 7.

The voltage (signal) of the wiring that connects the drain electrode of the transistor TR3 and the one terminal of the AND circuit 7 is determined by the resistance $R_3$, the resistance $R_4$ and the anode voltage (anode), and can be calculated with the following (Expression 2).

Wiring voltage (signal)=$R_3$/($R_3$+$R_4$)×anode voltage  (Expression 2)

The wiring voltage (signal) is then adjusted to a voltage suitable as an input voltage for the AND circuit 7 (ordinarily 3.3V).

The capacitor $C_4$ is a capacitor that adjusts the time in which an enable signal that is output from the AND circuit 7 is brought to a low state (off state), and that time is determined by τ=$R_3$×$C_4$ (Expression 3).

It should be noted that when the PWM signal supplied to the LED driver 3 is high, the wiring voltage (signal) becomes the voltage calculated by the aforementioned (Expression 2), and the resistance $R_3$ and the resistance $R_4$ should be adjusted to a voltage with which the AND circuit 7 can be confirmed as high.

The wiring voltage (signal) then becomes a high-level voltage, a high-level enable signal is output from the AND circuit 7 to the LED driver 3, and the LED driver 3 is brought to an on state.

On the other hand, when the PWM signal supplied to the LED driver 3 is low, the anode voltage (signal) gradually drops according to the length of the period in which the PWM signal is in a low state.

The anode voltage (anode) does not drop considerably when the low state period of the PWM signal is equal to or shorter than several milliseconds, but the anode voltage (anode) does drop considerably when the low state period of the PWM signal is equal to or longer than several 100 msec, and a voltage is therefore not output from the drain electrode of the transistor TR3 when the low state period of the PWM signal is equal to or longer than several 100 msec, which is the same as the transistor TR3 being in an off state.

In a case such as this, the wiring voltage (signal) drops to a voltage equal to or lower than a threshold voltage Vth of the AND circuit 7 after a time constant (time) determined by $\tau = R_3 \times C_4$ (Expression 3).

If the wiring voltage (signal) becomes a voltage that is lower than the threshold voltage Vth of the AND circuit 7, a low-level enable signal is output from the AND circuit 7 to the LED driver 3, and the LED driver 3 is brought to an off state.

Thereafter, if the PWM signal becomes high once again, the LED driver 3 activates in a state in which the soft start function has turned on, and an excess current therefore does not flow (see IDD).

As described above, in the light emitting diode driver circuit 20 of the present embodiment, it is possible to suppress a booster circuit starting up suddenly and an excess current flowing in a power source in the case where a PWM signal enters a high state (on state) after having been held in a low state (off state) for a prescribed period or longer.

<Summary>

A light emitting diode driver circuit according to one aspect of the present invention is a light emitting diode driver circuit provided with a control unit that controls a booster circuit that adjusts a luminance of a light emitting diode in accordance with a pulse width modulation signal, and is a configuration in which the pulse width modulation signal is input to the control unit, an enable signal generating unit generates an enable signal for controlling an on/off state of the control unit and supplies the enable signal to the control unit, an enable signal for controlling the control unit to the off state being generated if the pulse width modulation signal has been low for a prescribed period or longer, and the control unit is provided with a soft start unit that performs control such that the booster circuit is driven with a soft start if the enable signal was an enable signal for controlling the control unit to the on state from the off state.

According to the aforementioned configuration, an enable signal for controlling the control unit to the off state is generated in the enable signal generating unit if the pulse width modulation signal has been low for a prescribed period or longer, and the control unit is provided with the soft start unit that performs control such that the booster circuit is driven with a soft start if the enable signal was an enable signal for controlling the control unit to the on state from the off state.

Consequently, it is possible to realize a light emitting diode driver circuit that can suppress the booster circuit starting up suddenly and an excess current flowing in a power source in the case where the PWM signal enters a high state (on state) after having been held in a low state (off state) for a prescribed period or longer.

In the light emitting diode driver circuit according to one aspect of the present invention, it is preferable that a counter circuit be provided in the enable signal generating unit, the pulse width modulation signal and a control signal that is not dependent on the pulse width modulation signal and controls an on/off state of the control unit be input to the enable signal generating unit, and the enable signal generating unit generate the enable signal in accordance with the control signal and a counter output signal that is output from the counter circuit, if the pulse width modulation signal has been low for the prescribed period or longer.

According to the aforementioned configuration, an enable signal for controlling the control unit to an off state is generated by the enable signal generating unit, which is provided with the counter circuit, if the pulse width modulation signal has been low for a prescribed period or longer.

In the light emitting diode driver circuit according to one aspect of the present invention, it is preferable that an inverter and an AND circuit be provided in the enable signal generating unit, the control signal and a signal obtained by the counter output signal being phase-inverted by way of the inverter be input to the AND circuit, and the enable signal be output from the AND circuit.

In the light emitting diode driver circuit according to one aspect of the present invention, it is preferable that the enable signal generating unit be provided with: an active element that outputs a power source voltage in accordance with the pulse width modulation signal; and an AND circuit to which the power source voltage that is output from the active element and a control signal that is not dependent on the pulse width modulation signal and controls the on/off state of the control unit are input, wiring through which the power source voltage that is output from the active element passes up to being input to the AND circuit be provided with a resistance and a capacitance for adjusting a time during which the power source voltage drops if the power source voltage is not output from the active element, a value of the resistance and a value of the capacitance be set such that the power source voltage of the wiring becomes equal to or less than a threshold voltage of the AND circuit after the prescribed period or longer if the power source voltage is not output from the active element, and the enable signal be output from the AND circuit.

According to the aforementioned configuration, an enable signal for controlling the control unit to an off state is generated by the enable signal generating unit using the power source voltage, if the pulse width modulation signal has been low for a prescribed period or longer.

In the light emitting diode driver circuit according to one aspect of the present invention, it is preferable that the enable signal generating unit be provided with: an active element that outputs an anode voltage of the light emitting diode in accordance with a power source voltage; and an AND circuit to which the anode voltage that is output from the active element and a control signal that is not dependent on the pulse width modulation signal and controls the on/off state of the control unit are input, wiring through which the anode voltage that is output from the active element passes up to being input to the AND circuit be provided with a resistance and a capacitance for adjusting a time during which the anode voltage that is output from the active element drops, a value of the resistance and a value of the capacitance be set such that the anode voltage of the wiring becomes equal to or less than a threshold voltage of the AND circuit after the prescribed period or longer, and the enable signal be output from the AND circuit.

According to the aforementioned configuration, an enable signal for controlling the control unit to an off state is generated by the enable signal generating unit using the anode voltage of the light emitting diode, if the pulse width modulation signal has been low for a prescribed period or longer.

In the light emitting diode driver circuit according to one aspect of the present invention, it is preferable that a resistance that adjusts a voltage level of the anode voltage that is output from the active element be provided in the wiring.

In the light emitting diode driver circuit according to one aspect of the present invention, it is preferable that the prescribed period be equal to or longer than a period in which the anode voltage of the light emitting diode becomes equal to or less than a prescribed voltage.

A display device according to one aspect of the present invention is a configuration provided with, in a display unit, a light emitting diode that is driven by the light emitting diode driver circuit.

According to the aforementioned configuration, it is possible to realize a display device having greater reliability as a result of a display unit being provided with a light emitting diode that is driven by a light emitting diode driver circuit that can suppress a booster circuit starting up suddenly and an excess current flowing in a power source in the case where a pulse width modulation signal enters a high state (on state) after having been held in a low state (off state) for a prescribed period or longer.

An illumination device according to one aspect of the present invention is a configuration provided with a light emitting diode that is driven by the aforementioned light emitting diode driver circuit.

According to the aforementioned configuration, it is possible to realize an illumination device having greater reliability as a result of being provided with a light emitting diode that is driven by a light emitting diode driver circuit that can suppress a booster circuit starting up suddenly and an excess current flowing in a power source in the case where a pulse width modulation signal enters a high state (on state) after having been held in a low state (off state) for a prescribed period or longer.

A liquid crystal display device according to one aspect of the present invention is a configuration provided with a liquid crystal display panel, and the aforementioned illumination device as a backlight that irradiates the liquid crystal display panel with light.

According to the aforementioned configuration, it is possible to realize a liquid crystal display device having greater reliability as a result of a backlight being provided with a light emitting diode that is driven by a light emitting diode driver circuit that can suppress a booster circuit starting up suddenly and an excess current flowing in a power source in the case where a pulse width modulation signal enters a high state (on state) after having been held in a low state (off state) for a prescribed period or longer.

INDUSTRIAL APPLICABILITY

The present invention can be suitably used for an LED driver circuit, and a display device, an illumination device, and a liquid crystal display device provided with the LED driving device.

DESCRIPTION OF REFERENCE CHARACTERS 1 light emitting diode driver circuit
2 light emitting diode
3 LED driver (control unit)
5 counter circuit
5a oscillator
5b counter
6 inverter
7 AND circuit
10 light emitting diode driver circuit
11 enable signal generating unit
12 soft start unit
13 enable signal generating unit
14 enable signal generating unit
20 light emitting diode driver circuit
FET field effect transistor
TR1 transistor
TR2 transistor
TR3 transistor
$C_1, C_2, C_3, C_4$ capacitor (capacitance)
$R_1, R_2, R_3, R_4$ resistor
$L_1$ coil
$D_1$ diode

What is claimed is:

1. A light emitting diode driver circuit, comprising:
a control unit receiving a pulse width modulation signal and controlling a booster circuit for adjusting a luminance of a light emitting diode in accordance with said pulse width modulation signal; and
an enable signal generating unit that generates an enable signal for turning said control unit ON/OFF and supplies said enable signal to said control unit, the enable signal generating unit generating a signal that turns said control unit OFF as the enable signal when said pulse width modulation signal is LOW for a prescribed period or longer,
wherein said control unit includes a soft start unit that, when a signal that turns the control unit from OFF to ON is received as the enable signal, causes the control unit to control said booster circuit such that said booster circuit is driven with a soft start,
wherein the enable signal generating unit includes a counter circuit,
wherein the enable signal generating unit receives the pulse width modulation signal, and a control signal that is not dependent on said pulse width modulation signal, and
wherein, when said pulse width modulation signal is LOW for the prescribed period or longer, said enable signal generating unit generates said enable signal in accordance with said control signal and a counter output signal that is output from said counter circuit.

2. The light emitting diode driver circuit according to claim 1,
wherein the enable signal generating unit includes an inverter and an AND circuit,
wherein the AND circuit receives said control signal and a signal that is obtained by said counter output signal being phase-inverted by way of said inverter, and
wherein said AND circuit outputs the enable signal.

3. The light emitting diode driver circuit according to claim 1, wherein said prescribed period is equal to or longer than a period in which said anode voltage of said light emitting diode becomes equal to or less than a prescribed voltage.

4. A display device including a display unit that has a light emitting diode driven by the light emitting diode driver circuit according to claim 1.

5. An illumination device, comprising: a light emitting diode that is driven by the light emitting diode driver circuit according to claim 1.

6. A liquid crystal display device, comprising:
a liquid crystal display panel; and
the illumination device according to claim 5 as a backlight that illuminates said liquid crystal display panel.

7. A light emitting diode driver circuit, comprising:
a control unit receiving a pulse width modulation signal and controlling a booster circuit for adjusting a luminance of a light emitting diode in accordance with said pulse width modulation signal; and
an enable signal generating unit that generates an enable signal for turning said control unit ON/OFF and supplies said enable signal to said control unit, the enable signal generating unit generating a signal that turns said control unit OFF as the enable signal when said pulse width modulation signal is LOW for a prescribed period or longer,
wherein said control unit includes a soft start unit that, when a signal that turns the control unit from OFF to ON is received as the enable signal, causes the control unit to control said booster circuit such that said booster circuit is driven with a soft start,
wherein said enable signal generating unit includes:
an active element that outputs a power source voltage in accordance with the pulse width modulation signal; and
an AND circuit that receives said power source voltage that is output from said active element, and a control signal that is not dependent on said pulse width modulation signal,
wherein wiring through which said power source voltage that is output from said active element passes until being input to said AND circuit is provided with a resistor and a capacitor for adjusting a time during which said power source voltage drops when said power source voltage is not output from said active element,
wherein, when said power source voltage is not output from said active element, a value of said resistor and a value of said capacitor are set such that said power source voltage of said wiring becomes equal to or less than a threshold voltage of said AND circuit after said prescribed period or longer, and
wherein said enable signal is output from said AND circuit.

8. A light emitting diode driver circuit, comprising:
a control unit receiving a pulse width modulation signal and controlling a booster circuit for adjusting a luminance of a light emitting diode in accordance with said pulse width modulation signal; and
an enable signal generating unit that generates an enable signal for turning said control unit ON/OFF and supplies said enable signal to said control unit, the enable signal generating unit generating a signal that turns said control unit OFF as the enable signal when said pulse width modulation signal is LOW for a prescribed period or longer,
wherein said control unit includes a soft start unit that, when a signal that turns the control unit from OFF to ON is received as the enable signal, causes the control unit to control said booster circuit such that said booster circuit is driven with a soft start,
wherein said enable signal generating unit includes:
an active element that outputs an anode voltage of said light emitting diode in accordance with a power source voltage; and
an AND circuit that receives said anode voltage that is output from said active element and a control signal that is not dependent on said pulse width modulation signal,
wherein wiring through which said anode voltage that is output from said active element passes until being input to said AND circuit is provided with a resistor and a capacitor for adjusting a time during which said anode voltage that is output from said active element drops,
wherein a value of said resistor and a value of said capacitor are set such that said anode voltage of said wiring becomes equal to or less than a threshold voltage of said AND circuit after said prescribed period or longer, and
wherein said enable signal is output from said AND circuit.

9. The light emitting diode driver circuit according to claim 8, wherein the wiring includes a resistor that adjusts a voltage level of said anode voltage that is output from said active element.

* * * * *